Jan. 12, 1971  R. W. TERSCH  3,553,909
METHOD OF SHARPENING POT BROACH RINGS
Filed Aug. 19, 1969
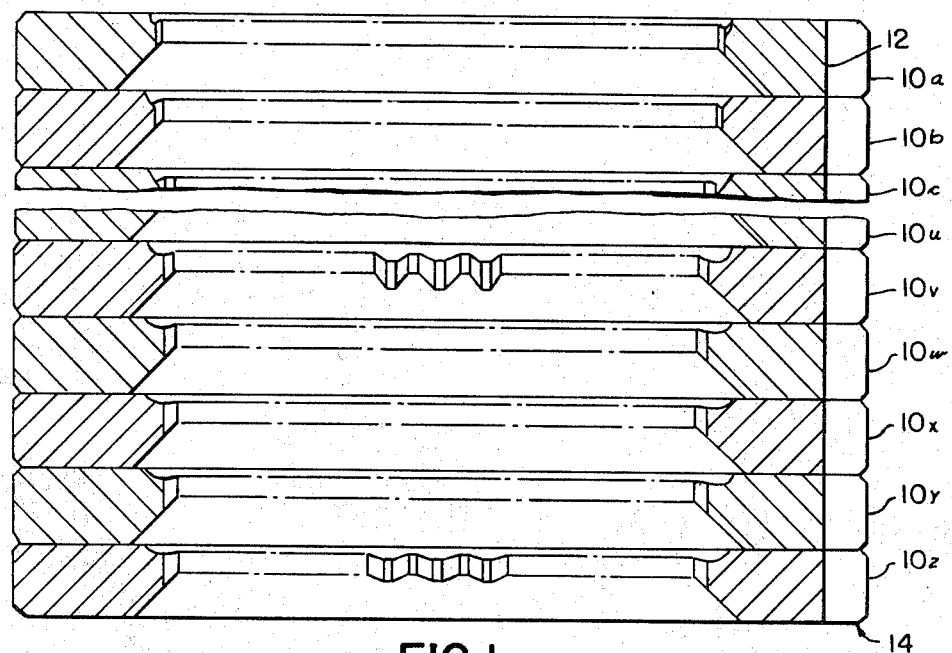
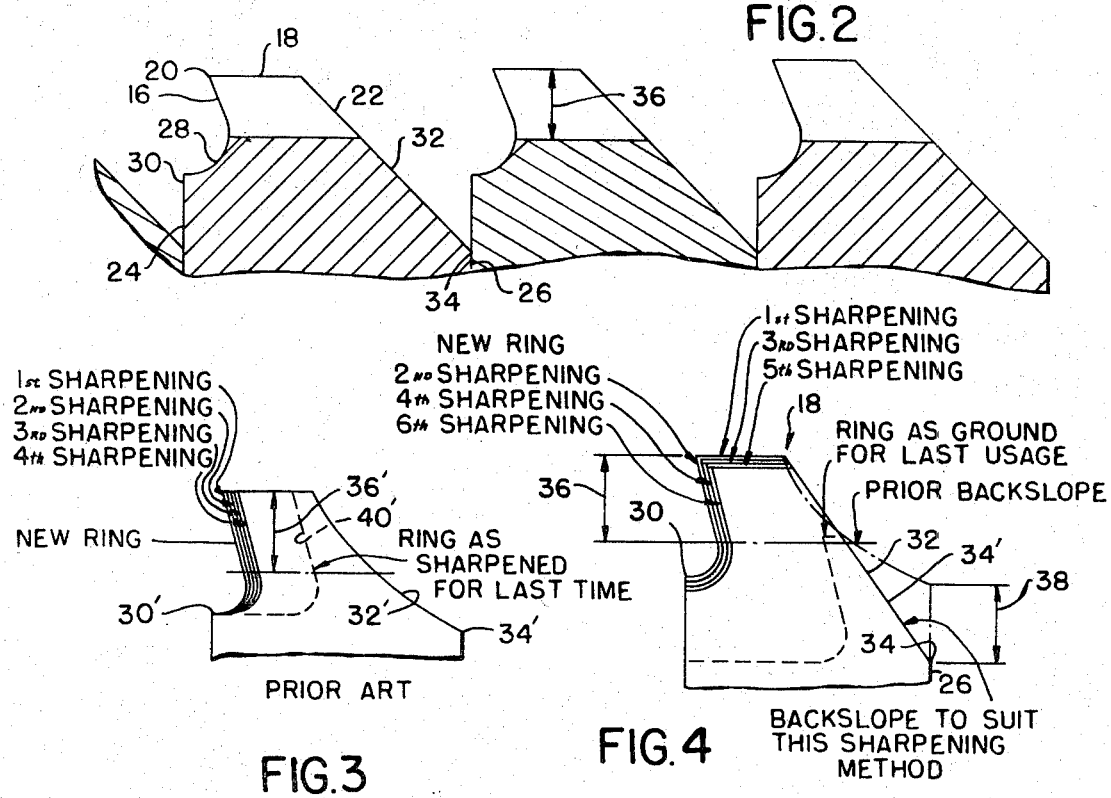
INVENTOR.
RICHARD W. TERSCH
BY Whittemore,
Hulbert & Belknap
ATTORNEYS

United States Patent Office 3,553,909
Patented Jan. 12, 1971

3,553,909
METHOD OF SHARPENING POT BROACH RINGS
Richard W. Tersch, Grosse Pointe Woods, Mich., assignor to Lear Siegler, Inc., Santa Monica, Calif., a corporation of Delaware
Filed Aug. 19, 1969, Ser. No. 851,208
Int. Cl. B24b 1/00
U.S. Cl. 51—323       5 Claims

ABSTRACT OF THE DISCLOSURE

Pot broach rings are successively reground by alternated face and I.D. grinds to increase ring usage by advancing I.D. ground rings successively forwardly in a broach assembly.

BRIEF SUMMARY OF THE INVENTION

Pot broaching of external gears employs a pot broach which usually comprises an assembly of annular broach rings each of which has a single series of internal cutting teeth. The outer surfaces of the rings are cylindrical and of identical size and are provided with accurately positioned locating keyways to insure assembly of the broach rings with the teeth in properly aligned position.

It has been the practice in the past to resharpen the rings when they have become dulled by face grinding the teeth. This has permitted a limited number of regrinds.

It will of course be appreciated that the teeth provided by successive rings are of increasing height or width, or both, in accordance with good broaching practice.

In accordance with the present invention the rings are designed so that they may be reground in accordance with a predetermined schedule on the faces of the teeth and on the I.D. For example, the face and I.D. grinds may be roughly alternated.

The amount of the I.D. grind is in each case sufficient to reduce the height of the teeth by the difference in height between a particular ring being ground and the ring which precedes it in the assembly. Thus, after each I.D. grind, each ring may be advanced in the broach assembly to occupy the next preceding position. The broach ring at the leading end of the assembly will be discarded and a new broach ring will be positioned at the trailing end of the assembly, each of the intermediate rings being advanced one station toward the leading end of the broach.

BRIEF DESCRIPTION OF THE DRAWINGS

FIG. 1 is a longitudinal sectional view through a pot broach assembly.

FIG. 2 is an enlarged fragmentary sectional view illustrating the tooth configuration at the I.D. of the broach rings.

FIG. 3 is an enlarged diagrammatic view illustrating prior practice.

FIG. 4 is a view similar to FIG. 3 illustrating the modified broach configuration.

DETAILED DESCRIPTION

In pot broaching an external gear is produced by movement relative to an internal pot broach having progressively stepped teeth to cut full sized tooth spaces in a single pass. A broach of this type is illustrated in Psenka Pat. 3,332,129.

In accordance with the present invention the pot broach is made up of an assembly of broach rings generally indicated at 10 but designated in FIG. 1 at 10a, 10b, 10c, 10u, 10v, 10w, 10x, 10y, and 10z. In practice the external surfaces of these broach rings are smooth cylindrical surfaces except for recesses 12 which when aligned constitute a longitudinally extending keyway indicated generally at 14. The broach rings are assembled in a holder and are located circumferentially by means of a key extending into the keyway 14.

The broach rings are provided at their interior with a circular series of cutting teeth. These teeth have the configuration illustrated in FIG. 2. Each tooth is provided with a front surface 16 inclined to provide positive rake. The top surfaces 18 of the teeth are slightly inclined to provide cutting clearance in rear of the top cutting edge indicated at 20. The back surfaces of the teeth have back-slope as indicated at 22. The front of each ring includes a flat annular surface 24 and the rear of each ring includes a flat annular rear surface 26. In assembly, the broach rings are in abutment with the surfaces 24 and 26 in contact with the corresponding surfaces of adjacent rings.

At the front of each ring there is formed an annular concavely curved fillet 28 which intersects with the flat front surface 24 thereof at the point 30, this intersection defining a circle. The fillet 28 merges smoothly into the front surface 16 of the teeth.

Similarly, the rear of the broach ring is provided with a continuous conical surface 32 of which the back-slope surface 22 of the teeth is an extension. The continuous conical surface 32 at the rear of each broach ring intersects as indicated at 34 with the flat rear surface 26 thereof. The intersection 34 defines a circle at the rear of the broach ring.

In accordance with the present invention the circle at the front of the broach ring provided by the intersection 30 is substantially larger than the circle defined at the rear thereof by the intersection 34. In practice, as will subsequently appear, the difference in radii between the front and rear circles is approximately equal to the height of the teeth 18, this height being indicated in FIG. 2 as the dimension designated 36.

The foregoing description is applicable particularly to the new broach rings as they are supplied at the trailing end of the pot broach and before substantial regrinding.

Pot broach rings in accordance with prior usage have had the configuration diagrammatically illustrated in FIG. 3 where it will be observed that the difference in radii between the front circle formed by the intersection 30' and the rear circle formed by the intersection 34' is not substantially equal to the tooth height 36'. Moreover, it will be observed that the rear of the broach is provided with a concave annular surface 32'.

This broach ring was designed for resharpening by a face grinding operation as indicated in FIG. 3, and in practice sufficient material was provided for a limited number of sharpenings such for example as 36.

Referring now to FIG. 4 the configuration of the tooth 18 constructed in accordance with the present invention, is indicated. It will be understood that the broach ring illustrated in FIG. 4 is the broach ring intended for installation in the broach assembly at the trailing position so that the full sized teeth of the broach ring determine exactly the final shape and size of the teeth on a work piece. As best illustrated in this figure, the rear conical surface 32 of the broach intersects the flat rear surface 26 thereof at the point 34 and this point is spaced radially inwardly from the point 34' which would be the location of the intersection of a broach ring constructed in accordance with present practice by a dimension 38. It will also be observed that the location of the circle defined by the intersection 34 is spaced inwardly from the circle defined by the intersection 30 by an amount approximately equal to the full tooth depth 36.

In a specific example a pot broach was provided employing 63 broach rings. As initially furnished these broach rings in general were of gradually increasing tooth height so that as the broach was passed over the workpiece or the workpiece was passed through the broach, successive broach rings took successive cuts to form the tooth spaces to the dimension determined by the dimensions of the teeth on the last broach ring or the last few broach rings if they are provided in an identical finishing set.

According to the present practice, as best illustrated in FIG. 3, the broach rings are all sharpened by face sharpening and when material has been removed to the line designated 40' in FIG. 3, the broach rings are scrapped.

In accordance with the present invention, and in accordance with the specific example referred to, only the first set of rings supplied with the broach are of progressively larger tooth size. The resharpening operation in accordance with the present invention comprises substantially alternate face sharpening as indicated by the second, fourth and sixth sharpening shown on the drawing, and I.D. grinding as shown by the first, third and fifth sharpenings on the drawing. In this case the I.D. grinding reduces the I.D. of each broach ring to the dimension required for the preceding broach ring in the assembly. Accordingly, the leading broach ring is discarded and each I.D. ground broach ring is advanced to the preceeding station and a new full size broach ring is provided at the rear of the assembly.

It is recognized that at different locations in the broach there may be variations in the amount of difference in tooth height between adjacent teeth. Accordingly, it will normally be desirable to provide a program indicating the sequence of sharpening operations as to face grinding or I.D. grinding and the amount of stock which is to be removed in each regrinding operation. For example, assuming that the stock removal for each face grinding operation is .0035", it is found that the number of face grind sharpenings can be increased substantially. In one specific example where 36 face grind sharpenings, each removing .0035" and terminated when the land at the top of the tooth was reduced to $\frac{1}{32}$", only 37 usages for the broach rings were permitted. However, when the broach rings are initially designed in accordance with the present invention and are sharpened or reground in accordance with the program disclosed herein, the number of face grindings is increased from 36 to 53, and in addition the broach rings as they are increased in I.D., may have 63 I.D. grinds, thus providing 64 usages. The total number of usages is thus increased from 37 to 118 for the broach ring positioned at the rear of the assembly.

Of course, the broach rings which were furnished new at the increased I.D. corresponding to intermediate positions in the broach assembly, will have a lesser number of usages. However, as the method is continued and new broach rings are supplied only to the rear of the broach assembly, eventually all broach rings will have the maximum increased number of usages.

While the specific embodiment illustrated herein is of rings having internal teeth, it is obvious that externally toothed rings or discs might be similarly employed to form an external broach.

What I claim as my invention is:

1. The method of sharpening broaches made up of a support body and a multiplicity of broach rings each of which has a circular series of cutting teeth, the diameters of the circles defined by the tips of the teeth being progressively stepped along the broach, which comprises grinding the individual broach rings in a sequence of grinds made up of face grinds in which material is removed from the cuting faces of the teeth and tooth top grinds in which material is removed from the tops of the teeth, scrapping the leading ring and adding a new trailing ring upon each tooth top grind.

2. The method as defined in claim 1 in which the amount of material removed at the tooth top grind of each ring is approximately equal to the difference in tooth top diameter between such ring and the preceding ring.

3. The method as defined in claim 1 in which the broach is a pot broach, the rings are internally toothed annular bodies, and the tooth top grind is an I.D. grind which increases the I.D. of the ring.

4. The method as defined in claim 3 in which the number of face grinds and the number of I.D. grinds are approximately equal.

5. The method as defined in claim 4 in which the face and I.D. grinds are approximately alternated.

References Cited
UNITED STATES PATENTS

| | | | |
|---|---|---|---|
| 772,841 | 10/1904 | Smith | 29—95.1 |
| 1,536,736 | 5/1925 | Vokal et al. | 51—288X |
| 1,806,552 | 5/1931 | Atwood | 29—95.1 |
| 3,332,129 | 7/1967 | Psenka | 29—95.1 |

LESTER M. SWINGLE, Primary Examiner

U.S. Cl. X.R.

29—95.1; 51—288